(12) United States Patent
Huneker et al.

(10) Patent No.: US 12,531,151 B2
(45) Date of Patent: Jan. 20, 2026

(54) COMPUTERIZED SYSTEM FOR THE REPEATED DETERMINATION OF A SET OF AT LEAST ONE CONTROL PARAMETERS OF A MEDICAL DEVICE

(71) Applicant: DIABELOOP, Grenoble (FR)

(72) Inventors: Erik Huneker, Puteaux (FR); Yousra Tourki, Paris (FR); Hector Romero-Ugalde, Gieres (FR)

(73) Assignee: DIABELOOP, Grenoble (FR)

( * ) Notice: Subject to any disclaimer, the term of this patent is extended or adjusted under 35 U.S.C. 154(b) by 237 days.

(21) Appl. No.: 18/248,684

(22) PCT Filed: Oct. 13, 2021

(86) PCT No.: PCT/EP2021/078258
§ 371 (c)(1),
(2) Date: Apr. 11, 2023

(87) PCT Pub. No.: WO2022/079077
PCT Pub. Date: Apr. 21, 2022

(65) Prior Publication Data
US 2023/0386656 A1 Nov. 30, 2023

(30) Foreign Application Priority Data

Oct. 13, 2020 (EP) .................................. 20201626

(51) Int. Cl.
G16H 20/17 (2018.01)
G16H 40/40 (2018.01)
G16H 50/20 (2018.01)
G16H 50/30 (2018.01)
G16H 40/67 (2018.01)

(52) U.S. Cl.
CPC ............. *G16H 40/40* (2018.01); *G16H 20/17* (2018.01); *G16H 50/20* (2018.01); *G16H 50/30* (2018.01); *G16H 40/67* (2018.01)

(58) Field of Classification Search
None
See application file for complete search history.

(56) References Cited

U.S. PATENT DOCUMENTS

| 9,646,244 | B2 | 5/2017 | Corrado et al. | |
|---|---|---|---|---|
| 2006/0111857 | A1* | 5/2006 | Shah | G01D 1/00 702/85 |
| 2006/0212337 | A1* | 9/2006 | Vayghan | G06Q 30/0204 705/7.14 |
| 2012/0059353 | A1* | 3/2012 | Kovatchev | A61P 3/10 604/504 |

(Continued)

OTHER PUBLICATIONS

International Search Report mailed Jan. 24, 2022 for related PCT/EP2021/078258.

(Continued)

*Primary Examiner* — John A Pauls

(57) ABSTRACT

The computerized system comprises a processor with: a security module (5) which evaluates a potential health risk of the patient, a decision module (9) which determines a set of control parameters based on a function of the security module (5), a first blackbox module (6), a second interpretable module (7) and a confidence assessment module (8) assessing confidence in the first blackbox module (6).

14 Claims, 3 Drawing Sheets

(56) References Cited

U.S. PATENT DOCUMENTS

| | | | |
|---|---|---|---|
| 2013/0030358 A1* | 1/2013 | Yodfat | A61M 5/14248 |
| | | | 702/19 |
| 2017/0364795 A1* | 12/2017 | Anderson | G06N 20/10 |
| 2019/0304596 A1* | 10/2019 | Padala | G16H 40/20 |
| 2020/0098465 A1 | 3/2020 | Jiang et al. | |
| 2020/0108203 A1 | 4/2020 | Lamrani et al. | |
| 2020/0282141 A1 | 9/2020 | Rousson et al. | |
| 2020/0382361 A1* | 12/2020 | Chandrasekhar | G06N 5/01 |
| 2021/0260289 A1* | 8/2021 | Kamath | A61M 5/1723 |
| 2021/0334695 A1* | 10/2021 | Raj | G06F 11/3409 |
| 2022/0047237 A1* | 2/2022 | Liu | A61B 6/032 |
| 2024/0027975 A1* | 1/2024 | Eberle | F04B 51/00 |

OTHER PUBLICATIONS

European Search Report mailed Mar. 24, 2021 for related EP20201626.

* cited by examiner

[Fig. 1]
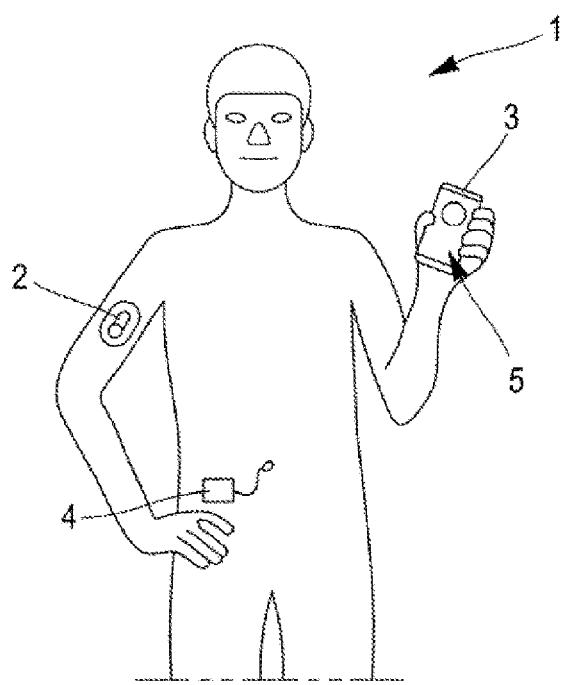
[Fig. 2]
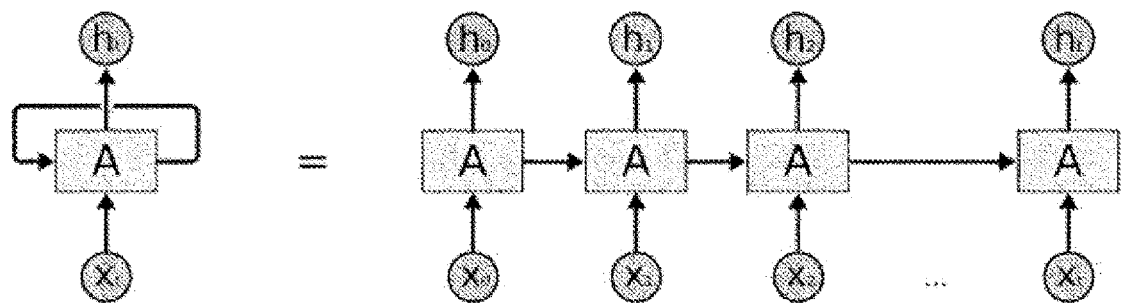

[Fig. 3]
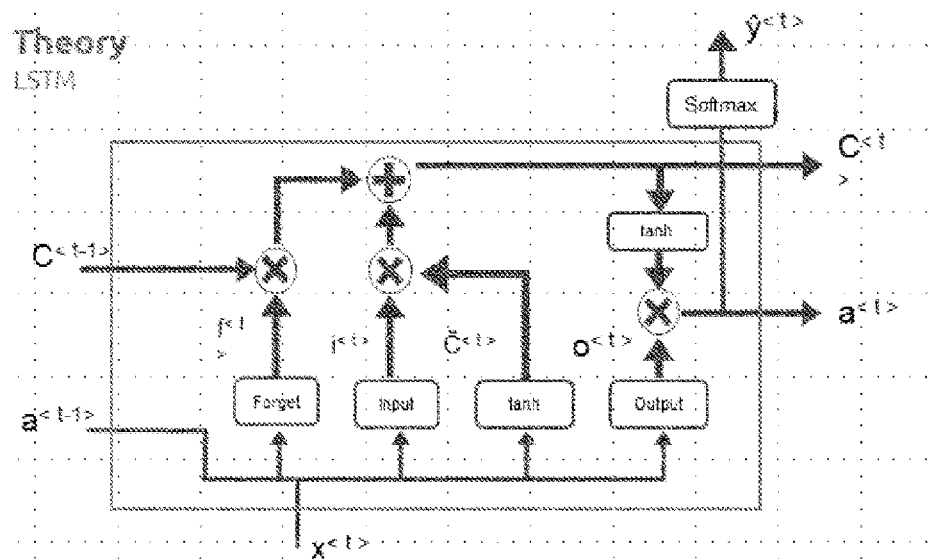
[Fig. 4]
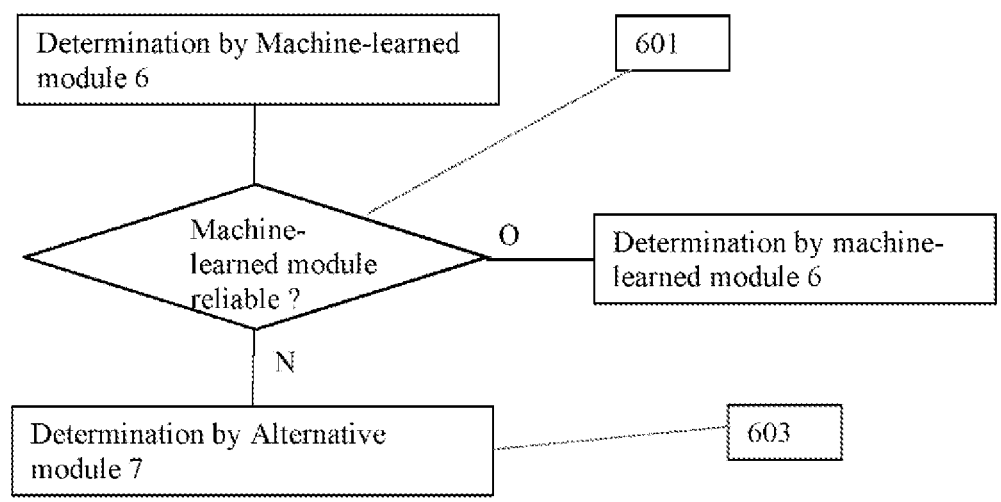

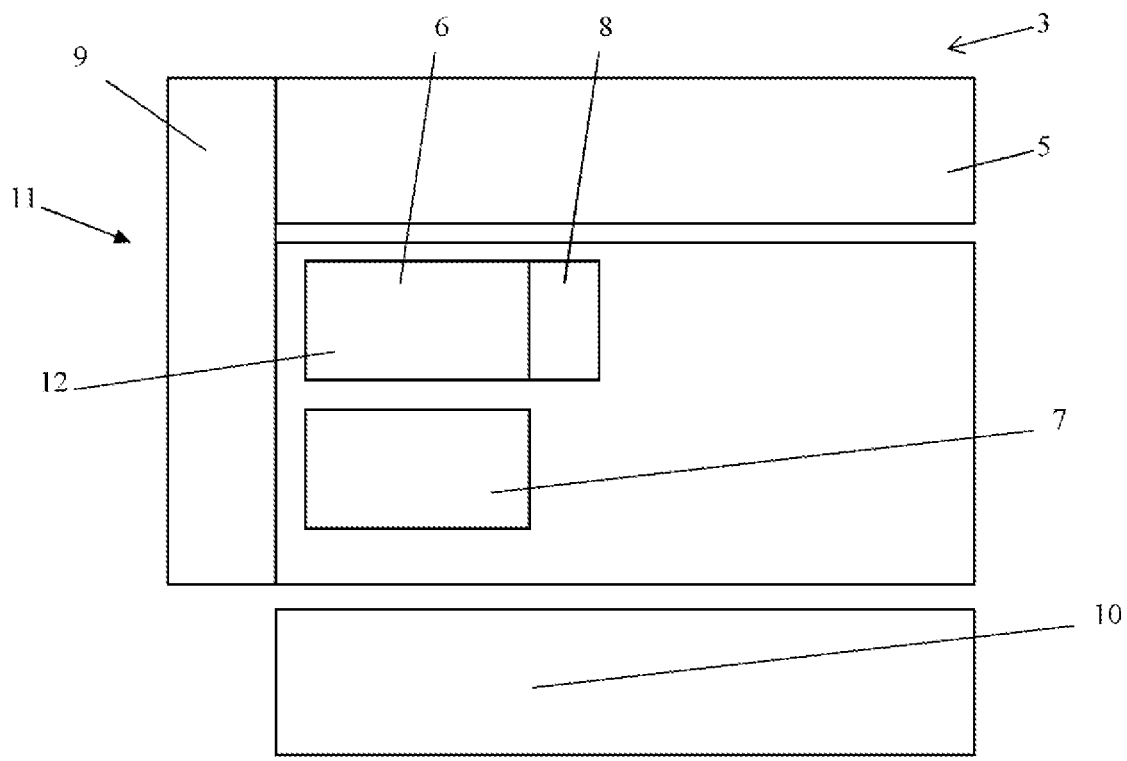
[Fig. 5]

COMPUTERIZED SYSTEM FOR THE REPEATED DETERMINATION OF A SET OF AT LEAST ONE CONTROL PARAMETERS OF A MEDICAL DEVICE

CROSS-REFERENCE TO RELATED APPLICATION

This application is a national stage application, filed under 35 U.S.C. § 371, of International Patent Application No. PCT/EP2021/078258, filed on Oct. 13, 2021, which claims the priority of European application No. 20201626.7 filed Oct. 13, 2020, the contents of which are incorporated by reference.

FIELD OF THE INVENTION

The present invention relates to computerized system for the repeated determination of a set of at least one control parameters of a medical device.

TECHNOLOGICAL BACKGROUND

In the field of medical science, software has become increasingly present. Many different kinds of software can be found in this field. One example is software used for the administrative support of a healthcare facility. Even if such software may exhibit some specific features due to the fact that it is specific to a healthcare facility, it is, in essence, an organizational software.

In a close field of endeavor, software is also known for managing electronic patient records. Because such records include critical medical data, these software may involve specific requirements in term of accuracy, reliability and security. However, they are, in essence, data management software.

In relation with the two above categories, in the field of medicine, software is used to transfer, store, convert formats and display data. Once more, except for the fact that these software treat medical data, which is critical in terms of confidentiality and accuracy, they bear little specificity of medical nature, as software.

Other types of software are more integrated in the medical field. In this category, one could mention software which can be used as a support for a medical decision by a practitioner. One could for example name patient data processing software. One typical example of patient data processing software is used in the field of medical imaging. Such software enables to process patient-related data, and to provide information to a practitioner. The provided information is for example an image, such as a 1D-image, a 2D-image, a 3D-image, . . . . The image can be used by the practitioner to perform a medical diagnostic and/or to prescribe a treatment. Instead of providing an image, the software may provide additional information, such as interpreted data, to support a medical diagnosis by a practitioner. Such an additional information may be obtained through processing the above-mentioned image, or images, or the input raw patient data. This description also applies to any kind of signal computerized treatment, where the treated signal relates to a health parameter of a patient.

Depending on the fields, the provided additional information may be an interesting asset for the practitioner in making its medical diagnosis and/or to prescribe a treatment. However, as an alternative, the additional information may include a proposed interpreted medical definition of the processed data and/or of the patient it originates from. In this case, the practitioner still makes the final medical decision, but there is a clear support from the software.

The medical software described above may be a so-called "locked" software, i.e. a predictable software which would provide the same result each time the same input data is provided. This would typically be the case of a medical imaging software, where the detected image of a given patient would directly depend only on the acquisition system.

However, as an alternative to the above "locked" software, recently, machine-learning technologies were developed, and may present an interest for medical software. While it goes beyond the present patent application to define "machine-learning", a "machine-learned" software is likely to provide different results based on the same input data, at two moments spaced in time, if the software has been updated in the meantime, when this update is based on new information obtained for a larger set of training samples. "Updating" the software may also be called "training", "teaching", or "re-calibrating". Such a software may therefore comprise two distinct modules: One module is a "determination" module, whose task is to provide the output, in a way similar to the above-described "locked" software. Another module is a "learning" module, whose task is to set and/or update the "determination" module based on past data. Such "machine-learned" "determination" modules of the software are therefore regularly updated, with a view to improving the quality of the output of the "determination" module of the software. These updates are typically implemented and validated through a well-defined and possibly fully automated process that aims at improving performance based on analysis of new or additional data. The updating process of the "determination" module of the software can be intended to address several different medical aspects, such as optimizing performance within a specific environment (e.g., based on the local patient population, notably the local patient), optimizing performance based on how the device is being used (e.g., based on preferences of a specific physician), improving performance as more data are collected, and/or changing the intended use of the device. "Improving performance" is subjective, and may be defined in a plurality of ways. For example, performance may be improved by raising the average accuracy of the outcome, or by reducing the number of errors, and these two improvements might not be simultaneous. The update process follows two stages: learning and updating. The software includes a "learning" module which "learns" how to change the behavior of the "determination" module, for example, from the addition of new input types or adding new cases to an already existing training database. The "update" then occurs when the new version of the "determination" module is deployed.

Even though learning rules are defined in order for the "updated" "determination" module to provide an output which is improved with respect to a previous version of the "determination" module, there are risks in the field of machine-learning based medical software. The risks are that the medical software would provide an output which is misleading for a medical decision. These risks are notably present because, even if the initial rules set into the software might be interpretable, and even if the rules for learning are also interpretable, the updated "determination" module might not be interpretable, or at least may be difficult to interpret, at least in some specific cases. Indeed, even if, globally, the updated machine-learned determination module is considered improved with respect to the previous version, there is always a possibility that, in a given circumstance, it is not possible for a human controller to understand why the updated machine learned determination module is improved with respect to a previous version. This leaves a doubt to the human controller as to whether the updated machine-learned determination module actually provides an improved output in this specific given circumstance. Therefore, it is difficult to control the accuracy of the results of the machine-learning-based medical software. Such a module is therefore called a blackbox module, in that it provides an output based on the input data, which is not always fully interpretable. In particular, when the blackbox determination module is to correspond to a physiological process occurring at the patient, the output of the blackbox determination module, based on input data, might not always be interpretable using physiological knowledge. Thus, the blackbox module operates as a black box, associating an output to an input data. However, it is difficult for a human controller to get a full understanding of what exactly happens inside the black box.

In the above-presented cases, the output of the software is presented to a human, typically the practitioner, which makes the final medical decision. Therefore, whatever the rules applied by the machine-learning-based medical software, the final responsibility lies in the medical practitioner. Further, if the human happens to overrule, or decide against the proposal from the machine-learning-based medical software, this could be used as a safety measure for the medical software, for example for temporally disabling it, coming back to a prior version, and/or using this information from the human as a new input to a further update of the software.

Yet, not all machine-learning-based medical software have their output reviewed by a human. In some particular cases, the output of the machine-learning-based medical software is directly input as a control parameter to a controllable medical device.

In particular, there is a case where a medical device has a computerized processor which controls operation of the medical device based on input data or parameters. In particular, in the field of the present invention, one considers these medical devices where the control data or parameters are defined based on a machine-learning process. In particular, one focuses on medical devices which perform a medical treatment on the patient.

When such a medical device performs a medical treatment on a patient, which is controlled by a processor based on an input parameter which is determined by a blackbox, there is a need to carefully check the functioning of the medical device. In particular, this is because the medical device performs a medical treatment on the patient, and thus an improper control of the medical device may cause health-related problems at the patient.

The aim of the present invention is to provide a computerized system which controls a blackbox medical device.

SUMMARY OF THE INVENTION

Thus, the invention relates to a computerized system for the repeated determination of a set of at least one control parameter of a medical device, the computerized system comprising a processor adapted to process data including patient-related data, the processor comprising:
 a security module adapted to evaluate, based on the data, a potential health risk of the patient,
 a first blackbox module adapted to determine said set using a machine-learned process on said data,
 a second interpretable module adapted to determine said set using an alternative process based on physiological knowledge,
 a confidence assessment module, adapted to assess a level of confidence in the first blackbox module,
 a decision module adapted to determine said set based on a function of the security module, the first blackbox module, the second module and the confidence assessment module.

Thus, the invention makes it possible to improve the safety of the patient submitted to a medical treatment applied by a medical device controlled by a parameter (or a set of parameters) determined by a blackbox.

In particular, the invention provides an improvement in the technical field of processor-controlled medical devices.

In particular, the invention effects a particular treatment or prophylaxis for diseases or medical conditions.

According to various aspects, one or more of the following features may be implemented.

According to some embodiments, the decision module is adapted to apply the security module and:
 Would the security module determine a potential health risk of the patient, determining said set by the security module,
 Would the security module determine no potential health risk, determining said set based on a function of the first blackbox module, the second module and the confidence assessment module.

According to some embodiments, the function comprises determining the set of control parameters by either the first blackbox module or the second module depending on the outcome of the confidence assessment module.

According to some embodiments, the confidence assessment module assesses a high level of confidence in the set of parameters determined by the first blackbox module, determining the set of control parameters by the first blackbox module and, when the confidence assessment module assesses a low level of confidence in the set of parameters determined by the first blackbox module, determining the set of control parameters by the second module.

According to some embodiments, the computerized system further comprises a machine-learning module adapted to repeatedly update the first blackbox module.

According to some embodiments, the computerized system comprises a scheduler, wherein the scheduler is operative to at least one of the following:
 the scheduler is adapted to cause the repeated determination of the set of control parameters more frequently, notably at least twice as frequently, even more notably at least ten times more frequently, than the update of the first blackbox module;
 the scheduler is adapted to cause the repeated determination of the set of control parameters more frequently, notably at least twice as frequently, even more notably at least ten times more frequently, than setting said function;
 the scheduler is adapted to set said function more frequently, notably at least twice as frequently, even more notably at least ten times more frequently, than the update of the first blackbox module.

According to some embodiments, the second module is not machine-learned.

According to some embodiments, the first blackbox module is adapted to determine said set using a blackbox prediction module adapted to estimate a predictive value for a physiological parameter of the patient.

According to some embodiments, the invention relates to a computerized medical system comprising a such a computerized system, and an active medical device controllable by at least one parameter of the set of parameters, and further comprises a communication module adapted to repeatedly communicate the at least one parameter of the set of parameters from the computerized system to the active medical device.

According to some embodiments, the active medical device is not implantable and/or comprises a pump controllable according to the set of control parameters to dispense fluid to the patient.

According to some embodiments, the active medical device is a dispenser, notably a medicine dispenser, and/or a fluid dispenser.

According to another aspect, the invention relates to a composition delivered by a dispenser of such a computerized medical system.

According to some embodiments, the invention relates to a computerized medical system further comprising a data acquisition system adapted to acquire patient-related data, and the communication module is adapted to repeatedly communicate the patient-related data to the computerized system.

According to another aspect, the invention relates to a computer program comprising instructions which, when the program is executed by a computer, cause the computer to carry out a repeated determination of a set of at least one control parameters of a medical device including the following:
- a security module evaluates, based on data including patient-related data, a potential health risk of the patient,
- a first blackbox module determines the set of parameters using a machine-learned process on said data,
- a second interpretable module determines the set of parameters using an alternative process based on physiological knowledge,
- a confidence assessment module assesses a level of confidence in the first blackbox module,
- a decision module determines the set of parameters based on a function of the security module, the first blackbox module, the second module and the confidence assessment module.

BRIEF DESCRIPTION OF THE DRAWINGS

Embodiments of the invention will be described below, in relation to the following drawings:

FIG. 1 schematically shows a medical system according to one embodiment of the invention.

FIG. 2 schematically shows a recurrent neural network applicable to one embodiment of the invention.

FIG. 3 schematically shows a node of a long short-term memory neural network applicable to one embodiment of the invention.

FIG. 4 is a diagram illustrating an example of an embodiment of an automated method of regulating blood glucose level implemented by the system of FIG. 1.

FIG. 5 is a diagram showing an example of implementation of the present system.

On the drawings, the same reference signs show the same or similar objects.

DETAILED DESCRIPTION

"Medical treatment" is defined as those applications that are intended to treat, cure, mitigate, or prevent disease or other conditions. In the present definition, "medical treatment" does not refer to a diagnosis application alone. However, it is apparent that, for the definition of "medical treatment" in the present document, this covers medical treatments which involve a diagnosis.

"Artificial intelligence" is defined as the science and engineering of making intelligent machines, especially intelligent computer programs. Artificial Intelligence can use different techniques, such as Machine-Learning, to produce intelligent behavior, including models based on statistical analysis of data, and expert systems that primarily rely on if-then statements.

A "Machine-Learning" system is defined as a system that has the capacity to learn based on training on a specific task by tracking performance measure(s).

"Artificial Intelligence", and specifically "Machine Learning", are techniques used to design and train software algorithms to learn from and act on data.

Although the present description uses words such as "repeatedly" or "frequency", it only means that a step is repeated from time to time. It does not necessarily mean that the interval of time between two repetitions be regular, constant, or follow any specific rule.

FIG. 1 typically shows a medical system 1. The medical system 1 comprises a data acquisition system 2, a data processing system 3, and an active system 4.

The medical system 1 is a computerized medical system 1. In particular, the data processing system 3 is a computerized data processing system. Typically, the data acquisition system 2 comprises a computerized data acquisition system, since it has become common to use a processor to process data obtained from a sensor. The active system may be a computerized active system 4, comprising a processor which performs a process based on input parameters. However, the active system might be controllable without using a processor.

Any computerized system may include a processing subsystem, a storage subsystem, a user interface, a communication subsystem, a power subsystem. A computerized system may also include other components (not explicitly shown).

A storage subsystem can store data, in a more or less arranged fashion; and/or other types of information, examples of which are described below. In some embodiments, a storage subsystem can also store one or more computer programs to be executed by a processing subsystem.

A user interface can include any combination of input and output devices. A user can operate input devices of a user interface to provide information to the computerized system and can receive information from the computerized system via output devices of a user interface.

Examples of output devices include screens or speakers, and haptic output generator, for example in the form of vibrations.

Examples of input devices include microphone, touch sensor, and camera. A microphone can include any device that converts sound waves into electronic signals. A touch sensor can include, e.g., a capacitive sensor array with the ability to localize contacts to a particular point or region on the surface of the sensor and in some instances, the ability to distinguish multiple simultaneous contacts. In some embodiments, a touch sensor can be overlaid over a screen to provide a touchscreen interface, and a processing subsystem can translate touch events (including taps and/or other gestures made with one or more contacts) into specific user inputs depending on what is currently displayed on the screen.

A processing subsystem can be implemented as one or more integrated circuits, e.g., one or more single-core or multi-core microprocessors or microcontrollers. In operation, a processing system can control the operation of the computerized system. In various embodiments, a processing subsystem can execute a variety of computer programs including program code and can maintain multiple concurrently executing programs or processes. At any given time, some or all of the program code to be executed can be resident in the processing subsystem and/or in a storage media such as the storage subsystem.

Through suitable programming, the processing subsystem can provide various functionalities for the computerized system. For example, in some embodiments, the processing subsystem can execute an operating system and various applications for interfacing with a remote device. In some embodiments, some or all of these application computer programs can interact with a remote computerized device, e.g., by generating messages to be sent to the remote device and/or by receiving and interpreting messages from the remote device. In some embodiments, some or all of the application computation programs can operate locally.

An RF (radio frequency) interface can allow the computerized system to communicate wirelessly with various remote devices. The RF interface can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication.

The communication system may include a connector interface which can allow the computerized system to communicate with various remote devices via a wired communication path, e.g., using Universal Serial Bus (USB), universal asynchronous receiver/transmitter (UART), or other protocols for wired data communication. In some embodiments, the connector interface can provide a power port, allowing the computerized system to receive power, e.g., to charge an internal battery.

A power subsystem can provide power for the computerized system. For example, a power subsystem can include a battery (e.g., a rechargeable battery) and associated circuitry to distribute power from battery to other components of the computerized system that require electrical power. In some embodiments, a power subsystem can also include circuitry operable to charge the battery, e.g., when a suitable connector interface is connected to a power source.

The power subsystem can also provide other power management capabilities, such as monitoring stored power in the battery and generating user alerts if the stored power drops below a predefined minimum threshold.

Further, while the medical system is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry. Embodiments can be realized in a variety of apparatus including electronic devices implemented using any combination of circuitry and software.

Communication between a computerized device and a wireless device can be implemented according to any communication protocol (or combination of protocols) that both devices are programmed or otherwise configured to use. In some instances, standard protocols such as Bluetooth protocols can be used.

The medical system 1 of FIG. 1 comprises three components which communicate with one another through wireless communication. More precisely, the data processing system 3 communicates with the data acquisition system 2 and with the active system 4 separately. In this example, there is no direct communication between the data acquisition system 2 and the active system 4. In variant embodiments, the communication between the components might be wired. In a variant embodiment, the data processing system 3 could be integrated within the same unit as the data acquisition system 2. In a variant embodiment, the data processing system 3 could be integrated within the same unit as the active system 4. In yet a variant embodiment, the data acquisition system 2 could be integrated within the same unit as the active system 4. Thus, according to one embodiment, the data acquisition system 2, the processing system 3 and the active system 4 may be integrated within the same device.

The data acquisition system 2 is a system to acquire medical data of the patient. The data acquisition system may be characterized both by the acquisition technology and by the parameter sought to be measured. Examples of such acquisition technologies include medical imaging, including imaging at various wavelengths, such as optical imaging, X-ray imaging, nuclear imaging, MRI, PET imaging. Examples of such acquisition technologies also include sensors adapted for the detection of electrical or magnetic fields, for the detection of force, position or movement, of chemical or physical composition or else, or a combination of those. Examples may for example include electrocardiograms, measurement of blood pressure, inertial measurements, accelerometers, measurement of glomerular filtration rate, photoplethysmography, etc. . . . .

The medical data of the patient may be any medical data relevant for the system, such as a shape of an organ, a chemical or biological composition, a position, a dimension, an orientation, an area, a volume, a moment of inertia, a temperature, a pressure, a frequency, a work, a power, an energy, a force, a moment, or any evolution of any of these parameters as a function of time, . . . .

The data acquisition system may also include, on top of the medical data acquisition system, acquisition of non-medical data, if they are relevant for the medical system. Such non-medical data may include patient identification, time and date, age, sex, body weight, patient location (position and/or orientation), environmental information, such as ambient light, local temperature, ambient sound, stress, social information (employment, travel, holiday, . . . ) . . . .

The medical system 1 also comprises a data processing system 3. The data processing system 3 will be described below. The data processing system 3 processes data acquired by the data acquisition system 2. It should be noted that, according to one embodiment of the invention, the data acquisition system 2 itself may also perform some level of data processing on the acquired data, such as data filtering and preparation. This is especially the case if the data acquisition system 2 is remote from the data processing system 3 and wirelessly communicates with it, so as to optimize energy devoted to data transfer.

The data-processing system 3 is a computerized system which operates data-processing determined according to an artificial intelligence-based scheme. The result of the data-processing is an output. In particular, in the medical system 1, the output can include a set of at least one control parameters for the active system 4. The output may also include control parameters for another system, or non-control parameters, such as calculated, treated or interpreted data which may be stored or read for other purposes than controlling a system.

The artificial intelligence-based system according to one embodiment is shown on FIG. 5. The "determination" module 11 comprises a security module 5, a blackbox module 6, a confidence assessment module 8 adapted to assess confidence in the blackbox module 6, and an alternative module 7. A decision module 9 is adapted to architecture the operation of the above-described components. Further, the system comprises a "machine-learning" module 10.

According to a machine-learning-based scheme in general, at a first instant of time, the "determination" module 11 applies, for obtaining an output, a first process on the data, thereby providing a first result. At a second instant of time, after a learning step, for obtaining the same output, the "determination" module 11 applies a second process. If the second process was applied on the same input data as the one used for the first process, the second output obtained from the second process would be different from the first output. In the meantime, between the first instant of time and the second of time, the process to be applied for obtaining the result was updated. In particular in the field of machine-learning, the update of the process is based on knowledge of pairs of data and associated result. These pairs of data and associated result may be related to the subject of study, from which the data was acquired (for example, known past results of the subject of study and the associated data), or from other subjects of study. In this later case, machine-learning enables to update the process for a given aim based on collaborative data processing obtained from a possibly wide variety of remote subjects of study.

Due to the very nature of machine-learning based processes, it becomes difficult for a human being to control the relevancy of the output of the blackbox module 6. This is because the process applied to the data by the blackbox module might be so complex so as to not even be interpretable by the human mind. However, there remains a possibility that the blackbox module might not be relevant when applied to a specific set of input data. This is particularly the case in the field of medicine, where the data related to healthy population, is plentiful, but the data related to diseased population is scarce. It is even scarcer if one goes into specific diseases. Thus, it might be very difficult for the blackbox module to recognize and treat a specific disease. Further, because of this risk, there might also be a doubt for a human controller or observer that the output of the blackbox module is suitable for the patient.

The "determination" module thus comprises a confidence assessment module 8, designed to assess a level of confidence in the result determined by the blackbox module.

In the present example, the confidence assessment module 8 is based on past data acquired for the patient, and a past result of a past process applied on this past data.

More precisely, in a past period of time, past patient-data was acquired, and a past set of control parameters for the medical device were determined using a past process based on this past patient-data. When the past set of control parameters are obtained, they aim at providing a planned outcome. This past set of control parameters were used to control the medical device in the past, and the outcome of this control was also measured in the past. Because control is by essence imperfect, the actually measured outcome would be different from the planned outcome. The confidence assessment module 8 would measure the ability of a new process to provide a suitable set of control parameters by comparing the would-be planned outcome of applying the new process on the past data with the actually measured past outcome and/or with the planned outcome. This evaluation can be performed on a plurality of past data.

For example, the confidence assessment module 8 would apply the new process on past patient data to obtain an updated result, and the outcome of a simulation of the new process controlled by the updated result would be compared to the past actual outcome. An example is provided in the table below, for three past data sets of the patient:

| Data set | Planned outcome by applying past process | Actual outcome | Planned outcome by applying new process | Output by the confidence assessment module |
| --- | --- | --- | --- | --- |
| D1 | 28 | 27 | 29 | 7.4 |
| D2 |    | 57 | 53 | 7.0 |
| D3 | 64 | 79 | 65 | 17.7 |

According to this table, the new process is applied to three sets of prior data D1, D2, D3 for which the actual outcome is also known. The confidence in the new process, will be determined by comparing the outcome predicted for the new process based on this past input data to the actual past outcome for the past input data. The rules to determine the level of confidence will be established on a case by case basis. In the present case, the level of confidence is for example determined as the error between the planned outcome obtained from the new process and the actual outcome. As can be seen above, the error of the new process applied to D1 and D2 is about 7%, while the error applied to D3 amounts to 17.7%. This leaves an average error (taking into account all of D1, D2 and D3 with equal weight) of about 10.7%. Depending on the case, the confidence assessment module 8 will determine a result for the confidence in the new process.

It should be noted that it may also be possible to compare the new process with the past process, when applicable, in the frame of the confidence assessment module 8.

In the above example, may be no planned outcome was determined by the past process for data D2. However, an outcome was determined by the past process on data sets D1 and D3. In determining the confidence in the new process, the confidence assessment module may therefore also consider whether the new process is more accurate than the past process. For example, in the case above, for data D3, even though the error is still high, the planned outcome of the new process is closer to the measured outcome than the planned outcome of the past process. However, for data D1, even though the accuracy is higher than for D3, the planned outcome of the new process actually is less accurate than the planned outcome of the past process.

Since it might not always be possible to measure an actual outcome, the confidence assessment module 8 may use either or both of the above schemes.

The above example is a simplified example of a confidence assessment module. It gives as example an outcome of the process being an integer value. However, the outcome of the process might be more complex than an integer value. For example, it could be a curve of real numbers along time.

In such case, errors might be calculated using any suitable definition of distance, such as, for example, areas between two curves.

Hence, according to one embodiment of the invention, the "determination" module 11 comprises a confidence assessment module 8, adapted to assess a level of confidence in the blackbox module 6. The level of confidence may be applied either on the machine-learning process itself, i.e. the ability of the system to update the first process into a second process which is actually improved over the first process, on the updated process itself, i.e. the quality of the outputs provided by the second process, or on the outputs of the second process themselves, i.e. their ability to accurately correspond to the outputs to be expected by a reliable system.

Hence, according to one embodiment of the invention, the "determination" module 11 comprises a first computerized blackbox module 6 adapted to generate an output based on the input data. The blackbox module 6 is based on a machine-learned process.

This means that the first computerized blackbox module 6 was established by applying a "learning" process on data.

According to one embodiment of the invention, the medical system 1 comprises a second computerized module 7, which is adapted to generate an output based on the input data, which is not based on a machine-learned process. For example, the second computerized module 7 comprises pre-defined rules. Notably, the second computerized module 7 comprises interpretable rules. For example, it comprises rules set by a doctor to describe a particular medical condition, and to provide a result associated with this particular medical condition. This does not rule out the possibility, for the second computerized module 7, to be regularly updated.

In particular, the first computerized blackbox module 6 and the second computerized module 7 are two different ways of describing a same reality of the patient.

According to one embodiment of the invention, the "determination" module 11 comprises a decision module 9 taking into account the outputs by both the first computerized blackbox module 6 and the second computerized module 7. The output of the decision module 9 is a function of these two outputs. For example, the decision module 9 takes into account the output of the confidence assessment module 8 to provide its output. In other words, the output of the decision module 9 is a function of the first computerized blackbox module 6, the second computerized module 7 and the confidence assessment module 8.

According to one embodiment, if the confidence assessment module 8 sets the confidence in the outputs provided by the first (machine-learned) computerized blackbox module 6 as being over a pre-defined threshold, then the output of the decision module 9 would be the output from the first computerized blackbox module 6, else the output of the decision module 9 would be the output from the second computerized module 7.

According to one embodiment, if the confidence assessment module 8 sets the confidence in the output provided by the first (machine-learned) computerized blackbox module 6 as below a pre-defined threshold, then the second computerized module 7 would be run, and its output would be the output of the decision module 9.

According to other embodiments, the decision module 9 might apply various rules to provide an output taking into account the outputs from the first and second computerized modules 6, 7 and from the confidence assessment module 8, such as for example weighing the outputs of the first and second computerized modules 6, 7 based on the output from the confidence assessment module 8.

According to one embodiment of the invention, the "determination" module 11 further comprises a security module 5. The security module 5 is a computerized module programmed to analyze the input data and to assess one or more pre-determined health risk for the user based on the data. For example, the security module 5 may apply a predetermined set of rules to the input data, and compare the result with a pre-defined threshold. Assuming the security module 5 would determine a potential health risk of the patient, it may control related suitable action of the active system 4, as well as additional actions such as alarms or the like. Other details will be provided below.

According to one embodiment of the invention, the medical system comprises an active system 4. In particular, the active system 4 is controllable by a set of parameters. It means that the action of the active system would be different based on the value of one or more control parameters. In particular, the value of one or more control parameters may be determined by the computerized determination module 11 described above. When mentioning "value" in this context, any operational parameter may be considered as a value, such as a Boolean parameter, an integer parameter, a real parameter, a set of dependent or independent parameters, a control curve over time or over another parameter, a look-up table, . . . .

Hence, according to one embodiment of the invention, the first machine-learning based computerized blackbox module 6 provides, for the input data, a first output, which is a value of at least one of a set of control parameters of the active system 4. To simplify, this is referred to as a value of a control parameter. The second computerized module 7 provides, for the input data, a second output, which is a value of the control parameter of the active system 4. The decision module 9 provides, for the input data, a third output, which is a value of the control parameter of the active system 4 which, as described above, may be based on a combination of the first and the second outputs and may be based on the level of confidence in the blackbox module 6. The security module 5 provides, for the input data, a fourth output, which is a value of the control parameter of the active system 4. The output of the determination module 11 is a combination of the fourth output and of the third output. "Combination" here is to be understood broadly as covering the case where the output of the determination module 11 is the fourth output or is the third output.

Hence, according to this embodiment, there are four different ways of calculating the value of the control parameter of the active system 4 or, more generally speaking, the set of operational parameters of the active system 4 which are dependent on the input data.

The above determinations are performed from time to time. It may be regularly or periodically performed. It would depend on how easy it is to update the control parameter of the active system 4, and the inertia of the active system 4 in taking up updated control parameters. For example, the determination might be performed a plurality of times per day, once per hour, once every few minutes, or even more frequently than that, or even less frequently than that.

The output is sent to the active system 4 for controlling the active system 4. The active system 4 will adapt its operation based on the result it receives from the data processing system 3.

According to one embodiment of the invention, the decision module 9 also manages the results from the security module 5. The security module 5 is applied to the data. If the security module 5 detects a potential health risk for the patient, it determines a set of operational parameters for the active system 4. The set of operational parameters are sent to the active system to control the active system. For example, the set of operational parameters are to shut-off the active system 4, or to operate the active system 4 in standard mode, i.e. not personalized to the patient.

To the contrary, if the security module 5 detects no potential health risk to the patient, the first machine-learned computerized blackbox module 6 determines the set of operational parameters for the active system 4. The confidence assessment module 8 assesses the confidence in this set of operational parameters or in the first machine-learned computerized blackbox module 6. If the level of confidence is higher than a pre-defined threshold, the set of operational parameters are sent to the active system 4 to control the active system 4. If the level of confidence is lower than the pre-defined threshold, the second computerized module 7 determines the set of operational parameters for the active system 4. This set of operational parameters is sent to the active system 4 to control the active system 4.

A scheduler may be used to control the timing when the various steps are performed. For example, determination of the value of the control parameter may be performed at a regular frequency. In other options, this determination may be performed whenever sufficient patient data has been acquired.

The active system 4 operates under the control parameters. The operation of the active system may be monitored. This involves measuring the outcome of the active system, i.e. the outcome of the effect of the active system on the controlled parameter.

The above described scheme is performed regularly, for example, periodically, along time, to provide an updated set of parameters to the active system 4, based on updated data. Based on updated data, the above described scheme may provide an output different from the output of a previous calculation. Regularly, the machine-learned blackbox module 6 may be updated. Typically, the update frequency of the machine-learned blackbox module 6 would be lower than the frequency of the above-described scheme.

The first computerized blackbox module 6 is updated for example by modifying the module so as to provide outputs, based on input data, which provide an outcome which is closer to the actual outcome than the outputs provided by a previous version of the module on the same input data. This requires that the actual outcome of the input data be measured.

The medical system 1 thus comprises an updating machine-learning module 10 which regularly updates the first computerized blackbox module 6.

It should be noted that the machine-learning module 10 might be purely local, i.e. part of the data processing system 3, and performed from time to time by the data processing system 3 itself based on data from the data acquisition system 2. Updating the process might for example occur once per day, once per week, once per month, . . . or under this order of magnitude. However, according to variant embodiments, one might consider that the data processing system 3 comprises a communication module adapted to exchange data with a remote server (not shown). The remote server may comprise the machine-learning module 10 in charge of updating the process based on data exchanged with the data processing system 3. Further, the machine-learning module 10 in the remote server might update the process based on data received from other data processing systems.

An example of operation will be described below.

This example of operation is applied to the automated infusion of insulin to a Type-I diabetic patient.

The medical system comprises a data acquisition system 2. For example, the data acquisition system comprises a glucose monitoring system adapted to determine a quantity of glucose in the blood of the patient. Various kinds of sensors are applicable to provide this data. One example is a so-called continuous blood glucose monitoring which evaluates a quantity (mass, mol, mass percentage or mol percentage) of glucose in the patient blood at a high frequency, for example every minute, or even more frequently than that. Various technologies are possible, such as chemical micro-titration or optics. The data acquisition system may comprise additional sensors, such as another glucose monitoring system fixed elsewhere on the patient, or else.

The data acquisition system 2 may also comprise a system to acquire additional patent information. This includes for example meal information from the patient. For example, the data acquisition system 2 may comprise an interface allowing the patient to enter meal-related information. Any other information may be input into the medical system 1 through a declarative system.

The medical system comprises a data processing system 3. For example, the data processing system 3 is remote from the blood glucose monitoring system, and is adapted to communicate with it through any suitable means, such as wireless (radiofrequency, such as Bluetooth) or wiredly. However, for example, the above-described declarative interface of the data acquisition system 2 might be provided in the same unit as the data processing system 3. The data processing system 3 is designed to apply the "determination" module 11 on the acquired data, as will be described in more details below, and to determine a set of operating parameters for an active system 4 which, in the present case, comprises a pump.

The medical system 1 comprises an active system 4, which comprises an infusion system. For example, the data processing system 3 is remote from the active system 4, and is adapted to communicate with it through any suitable means, such as wireless (radiofrequency, such as Bluetooth) or wiredly.

In other embodiments, the data processing system might be integrated in a same physical object with the sensor or the infusion system.

The infusion system comprises an insulin tank comprising insulin, a cannula placing the insulin tank in communication with the blood of the patient, and a pump actionable to cause the insulin to flow from the insulin tank to within the patient. The pump is actionable according to operational parameters such as a volume, debit, duration of operation, of other parameters enabling to determine a quantity of fluid to flow though the system and into the patient within a given period of time.

The data processing system 3 comprises a security module 5. For example, the security module 5 is programmed to determine a risk of hypoglycemia of the patient. Various schemes are possible to determine a risk of hypoglycemia. For example, the risk of hypoglycemia could be determined based on the comparison of the current level of measured glycemia with respect to a pre-defined threshold. According to another example, the security module is programmed to determine a risk of future hypoglycemia of the patient. For example, the risk of future hypoglycemia could be determined based on the comparison of a potential future level of glycemia with respect to a pre-defined threshold. The potential future level of glycemia may be estimated by applying pre-defined rules on past measurements of glycemia over a given period of time. Further, meal information can be taken into account in this assessment. Insulin-on-board may also be taken into account in this assessment. "Insulin-on-board" refers to an estimation of a quantity of insulin still present in the body of the patient. Insulin-on-board may be assessed based on previous history of pump control. For example, in case of risk of hypoglycemia or risk of future hypoglycemia, the security module 5 controls the pump to a shut-off mode, i.e. not to infuse any insulin onto the body of the patient, for a predetermined period of time.

According to another example, the security module 5 is programmed to determine a risk of hyperglycemia, or of future hyperglycemia of the patient. Various schemes are possible to determine a risk of hyperglycemia or future hyperglycemia of the patient, which can be based on the current level and trend of measured glycemia, meal information and insulin-on-board. For example, in case of risk of hyperglycemia or risk of future hyperglycemia, the security module 5 controls the pump to a maximum delivery mode for a predetermined period of time.

Other security factors might be defined such as, for example, past or predicted time spent outside a pre-defined glycemia range, for which the security module 5 determines the set of control parameters for the pump.

In particular, the security module 5 is not machine-learned. The security module 5 is based on interpretable rules. It is determinist. Thus, any possible output of the security module 5 is explainable.

The data processing module 3 comprises a machine-learned blackbox module 6 to determine a control value for the pump. For example, the machine-learned blackbox module may not include any a priori analytical definition of a physiology of the patient. Therefore, the machine-learned module 6 is not physiologically explainable, at least not fully physiologically explainable.

The machine-learned blackbox module 6 is adapted to determine the doses of insulin to be injected into the patient, taking into account, in particular, the history of blood glucose measured by the sensor, the history of insulin injected by the infusion system, and the history of food ingestion by the patient, but may also consider other inputs such as the history of physical activity.

The machine-learned blackbox module 6 is adapted to determine the amount or rate of insulin to be administered to the patient. As an example the machine-learned module 6 takes into account a prediction of the future evolution of the blood glucose of the patient as a function of the time. More particularly, the machine-learned blackbox module 6 is adapted, from the history of blood glucose, injected insulin and ingested glucose history, and not completely based on an analytical physiological model describing a priori the insulin uptake by the patient's body and its impact on blood glucose, to determine a curve representative of the expected evolution of the patient's blood glucose as a function of time over a future period, for example a period of 1 to 10 hours for a given present and future control of the pump. Such a curve might comprise one or more points in the future time. By taking this curve into account, the machine-learned blackbox module 6 determines the doses of insulin to be injected into the patient during the coming period, so that the actual blood glucose (as opposed to the blood glucose level estimated from the machine-learned blackbox module 6) of the patient remains within acceptable limits, and in particular to limit the risk of hyperglycemia and/or hypoglycemia. In particular, the machine-learned blackbox module 6 determines the control parameter for the pump which is optimal for a given purpose, i.e. which minimizes a given cost function. For example, the machine-learned blackbox module 6 selects the control parameters which are most appropriate for the situation, maximizing a time spent in a glycaemia target range, and/or minimizing the risk of hypo- and/or hyper-glycaemia, and/or other aims.

One example of a machine-learned blackbox module 6 will be described below. The machine-learned blackbox module 6 applies a predictive module 12 for predicting a future value of the glycaemia of the patient based on current acquired data. The predictive module 12 is a blackbox module based on prior data. It does not take into account any pre-defined analytic definition of the physiology of the patient. According to one example, the predictive module 12 uses a neural network in order to determine the at least one predicted value for the glycaemia of the patient. The predicted value is determined for a future instant of time comprised between 5 minutes later to 120 minutes later than the latest input patient data. The neural network is a machine-learned neural network, which is machine-constructed based on prior patient data or based on a database containing prior data of a group of patients. In an example, the high-level architecture of the neural network may be defined a priori, but the parameters of the neural network may be adapted by the machine-learning process to improve a given situation for a given patient. As another example, both, the high level architecture of the neural network and the parameters of the neural network may be defined a priori for improving a given situation for a given group of patients to which the patient belongs.

For example, the neural network is a recurrent neural network. Upon study, the inventors evaluated that a recurrent neural network is particularly well-suited for prediction of glycaemia based on patient data. In fact, neural networks have shown to be powerful tools for modeling dynamic and complex systems due to their ability to process many inputs, and their ability to approximate any nonlinear function by setting different activation functions. In particular, recurrent neural networks are well-suited to handle temporal data, since they include at least a recurrency node in at least one of their elements (namely neurons or nodes). Recurrency helps the recurrent neural network to understand that the current output of a neuron depends on the input but also on the past output of the systems. In the particular case of blood glucose prediction, the recurrency allows the recurrent neural network to understand that the predicted glucose value does not depends only on the current level of insulin-on-board, or carbohydrate on board and the current value of blood glucose, but also depends on the past values of blood glucose, in other words, recurrent neural networks are able to understand dynamics of a given system.

FIG. 2 shows a simplified version of a recurrent neural network suitable to determine a value for a predicted glycaemia based on patient input data.

Upon further study, the inventors evaluated that a long short-term memory neural network was particularly suited for prediction of glycaemia based on patient data because it consists of a recurrent neural network that includes a forgetting factor in their nodes that enables it to take into account an old past relevant fact over recent irrelevant facts.

FIG. 3 shows a simplified version of a node of a long short-term memory recurrent neural network suitable to determine a value for a predicted glycaemia based on patient input data. The node thus combines most recent data with relevant past data to provide the cell output. In addition, relevant past data is updated in view of the most recent data.

On this drawing, "t" determines the current time "t" associated with the node. This time is an instant of past time for which patient data is available. "t−1" designates the previous instant of time where patient data was available. "tan h" designates the hyperbolic tangent function. However, other activation functions could be used in lieu of the hyperbolic tangent function. C-tilde(t) represents a candidate value for the cell state at time "t", which is dependent on the previous output "a" at time "t−1" and the input x at time "t". C-tilde(t) is computed as tan h(Wc*[a(t−1), x(t)]+bC]. "Softmax" is an activation function that transforms the output "a" at instant "t" into a probability.

"x" represents patient data used as input to the neural network. "y" represents the value of glycemia prediction determined by the neural network.

"a" and "C" represent propagation of information through time in the neural network. In particular, "a" propagates along time the result of the treatment by the node, whereas "c" keeps track of a plurality of treatment by previous nodes.

In addition, the node may comprise one or more of an input gate, an output gate, and a forget gate, such as shown on FIG. 3. The input gate applies a function i which controls the importance of the new information. The forget gate applies a function f which controls the importance of the historical information. The output gate applies a function o, which controls the importance of this node in the output.

The weights of the connections in, out, and between the gates of the node are learned during the machine-learning process.

According to one example, at the instant "t" when the determination of the predicted glycaemia is performed, patient data comprises glycaemia data of the patient before this instant, and obtained from the continuous glucose monitoring sensor for a past period of time. For example, glycaemia data comprises past data obtained from n hours before the instant t to the instant t (time interval [t−n; t]), with n may be a real value for example between 0.25 and 48.

The predicted glycaemia is determined by applying the recurrent neural network to this past data.

Training of the recurrent neural network is performed based on past data. Training is for example performed on older data, for which a value of measured glycaemia at the time of the predicted glycaemia is also available. For example, in the above example, if the predicted glycaemia is predicted for a time which is half an hour after the instant, training can be performed on past data obtained from n hours before the instant to the half an hour before instant. Applying the neural network to this training data enables to determine a predicted glycaemia, and to compare this predicted glycaemia to the glycaemia actually measured for this past instant. The weights of the neural network are therefore set so that the neural network provides the best prediction for past data for which actual data can be compared with the prediction. "Best" may be determined by any suitable way. This may involve for example determination of a neural network which provides a curve of predicted glycemia along time, where the area between the curve of predicted glycaemia and the curve of actual glycaemia is minimum.

According to another embodiment, patient data comprises glycaemia data of the patient before this instant, and obtained from the continuous glucose monitoring sensor for a past period of time, and insulin injection data before this instant, and obtained from the past determination values by the determination module 11.

According to yet another embodiment, patient data comprises glycaemia data of the patient before this instant, and obtained from the continuous glucose monitoring sensor for a past period of time, insulin injection data before this instant, and obtained from the past determination values by the determination module 11, and food ingestion data by the patient, obtained for example from the above-described declarative interface.

According to another embodiment, the recurrent neural network may be trained on data of a population of patients. In another embodiment the recurrent neural network is trained on a population of patients, and then, after having enough data of a given patient, the neural network is retrained on data from the particular patient in order to improve performance. The population of patients may consist of a global population of diabetic patients or a sub-group of patients with the same characteristics than the patient on which the trained neural network will be applied.

Hence, configuration of the neural network does not use any a priori information about the physiology of the patient, in particular defined in an analytical way.

The set of control parameters for the insulin infusion pump is determined by the machine-learned blackbox module 6 using as input, inter alia, the prediction for the glycaemia determined as disclosed above.

The machine-learned blackbox module 6 may apply a pre-defined rule to determine a value for the set of control parameters based on the input data. The input data includes, as discussed above, the prediction for the glycaemia determined by the predictive module 12, as well as insulin-on-board (iob), carbs-on-board (cob), glycaemia target or target range (T). Other pre-defined parameters may be taken into account, such as a parameter related to the patient's sensitivity to insulin.

For example, the set of control parameters is a quantity (Q) of insulin to be infused during the next timeslot, and may be determined using a pre-defined function f according to:
Q=f (IOB, COB, T, gg), Where gg corresponds to the above-described machine-learned prediction of glycaemia.

In previous examples, we described a machine-learned blackbox module 6 that performs a prediction used to determine a quantity or rate of insulin to be infused to a given patient during a time slot. In another embodiment, the machine-learned blackbox module 6 is learned to directly determine the required quantity of insulin. As a second example, the machine-learned module 6 was learned to determine a control parameter of insulin injection based on the current state, where the current state may be defined as a set of variables. For instance, a current state may be defined as the current (and past) glycaemia, current (and past) insulin-on-board and current (and past) carbohydrates-on-board. For example, according to a current state, where a current set may be defined as a set of variables such as current and past glycaemia, current and past insulin-on-board, current and past carbohydrates-on-board, etc., the machine-learned blackbox module 6 may consist of a neural network that receives as input an state and is learned to make an insulin recommendation based on that state:
Q=NN(state)

where NN is a neural network, and the state may be for instance state=[current glycaemia, current insulin-on-board, current carbohydrates-on-board]. Notice that in this example the output to the recurrent neural network is not a predicted glycaemia but directly the recommended insulin.

The confidence assessment module 8 is adapted to determine one or more numerical indicators of the relevancy of the machine-learned blackbox module 6. For example, the relevancy of the glycemia prediction determined by the prediction module 12 is assessed. For example, a plurality of values for the predicted glycaemia are determined for an interval of time from past patient data, so as to form a curve of predicted glycaemia along time. For example, the treatment and control unit calculates a quality digital indicator representative of a distance between the predicted glycaemia curve from the machine-learned blackbox module 6 applied on past data and the actual glycaemia curve measured by the sensor for a period of past observation. Distance may be determined by a plurality of ways. One example may be related to the area between the curves. This area might be weighted to place more weight on more recent errors than on past errors. Another example might be a difference between the most recent data and the predicted data for this same time. Another example might be a difference between the slope of the curve for the most recent data and the slope of the curve of the predicted data at the most recent instant. Other examples are also possible. Combinations of these examples are also possible. In another example, the machine-learned blackbox module 6 was learned to make a glycemia prediction but also to determine a confidence interval for that prediction. In that case, the decision module 9 receives as input the confidence interval and, based on a threshold, determines whether the prediction of the machine-learned blackbox module 6 may be used to make an insulin recommendation. Alternately, the confidence in the control parameters determined by the machine-learned blackbox module 6 is assessed.

The data processing system 3 uses a second computerized module 7 using a physiological model, for example a compartmental model to regulate the insulin injection.

For example, the second computerized module 7 implements predictive control, i.e., it uses a physiological model to predict the patient's future blood glucose and regulate the insulin injection accordingly. In a variant embodiment, the second computerized module 7 controls, for example, the infusion device to administer pre-programmed doses of insulin, corresponding for example to a baseline reference flow prescribed to the patient.

In any case, the second computerized module 7 is not machine-learned. Its output is predictable, and is interpretable by a human.

According to the above embodiment, each time the control parameter is to be estimated, the decision module 9 is run through the security module 5, the confidence assessment module 8, and the first and/or second modules 6, 7.

As a first step, the decision module 9 first runs the security module 5. If it is determined that the security module 5 should determine the set of control parameters (because of a security alert), the security module 5 determines the set of control parameters.

To the contrary, if it is determined that there is no situation where the security module should determine the set of control parameters (i.e. the patient security is not at risk), the decision module 9 does not determine the set of control parameters using the security module 5. The decision module 9 applies a combination of the blackbox module 6, the second computerized module 7 and the confidence assessment module 8.

As shown on FIG. 4, if, based on confidence assessment module 8, the machine-learned blackbox module 6 is considered reliable in step 601 (O), the first machine-learned blackbox module 6 defines control parameters of operation of the infusion device to regulate the administration of insulin to the patient.

If the machine-learned blackbox module 6 is judged insufficiently reliable at step 601 (N), the data processing system 3 does not use this module to regulate the administration of insulin to the patient, and implements a method of substitution control during a step 603.

Alternatively, the confidence assessment module 8 may be run at a given frequency which may be different from the frequency for determining the control parameter, and also different from the frequency for updating the machine-learned module and, especially, may be intermediate between these two frequencies.

The determined set of control parameters are sent to the active system 4 to regulate the infusion of insulin into the patient.

After some time, the machine-learned blackbox module 6 may be updated. For example, the machine-learned blackbox module 6 is updated based on data measurement on the patient alone. Based on past observations, the machine-learning module 10 updates the machine-learned module 6 with a rule which is deemed more closely matching the observed patient data than the previous rule. It may also be so that the machine-learning module 10 takes into account observation data from other patients in order to update the machine-learned blackbox module 6.

According to the above description, one embodiment of the invention could be applied to closed-loop insulin infusion for type-I diabetic patients.

According to a second example, the invention can be applied to patient-controlled analgesia.

According to this second example, the active system 4 comprises an infusion device adapted to deliver analgesia, such as morphine, to a patient.

The acquisition system may be adapted to acquire patient-related data, such as in particular pain evaluation (for example continuously or regularly auto-evaluated by the patient), sedation, and/or respiration.

The security module can be based on the sedation and respiration evaluation, and can control the shut-off of the infusion device.

The machine-learned module may provide an estimation of a quantity of sedative to be distributed based on a regularly-updated model of how the patient reacted in the past to morphine diffusion.

The non-machine-learned module may provide an estimation of a quantity of sedative to be distributed based on a predetermined rule taking into account physiological parameters of the patient and history of infused sedative.

According to a third example, the invention can be applied to the treatment of respiratory problems.

According to this third example, the active system 4 can include an inhalator providing air or a suitable inhalation gas to a patient.

The data acquisition system 2 may be adapted to acquire patient-related data, such as in particular respiratory efforts and/or desaturation of oxygen content in the blood.

The security module may be based on the evaluation of sleep apnea, for example a duration of time in a critical state. It can force the inhalator to full capacity, to a higher pressure and/or a higher frequency.

The machine-learned module may provide an estimation of a control parameter of the inhalator based on a regularly-updated model of patient's past respiration.

The non-machine-learned module may provide an estimation of the control parameter of the inhalator based on a predetermined rule taking into account physiological parameters of the patient.

As described above, the invention is suitable for non-implantable medical devices.

According to a fourth example, the invention may be applied to a cardiac pace maker, a deep-brain stimulator, a heart valve or an artificial heart.

According to a fifth example, the invention may be applied to the control of dialysis, in particular hemodialysis. The sensed parameter may be the glomerular filtration rate, and the set of control parameters a set of control parameters of a machine for dialysis.

According to some specific examples, the active system 4 is, in use, at least partly outside of the patient's body. If the data processing system 3 is, in use, also outside of the patient's body, it makes it easier to communicate between the two systems. Further, if the data processing system is, in use, outside of the patient's body, it makes easier to receive communications from a remote server.

In general, the invention seems applicable to any controllable medical device which continuously operates a medical action on a patient based on a control parameter, when this control parameter can be determined by a applying a machine-learned process on patient-related data.

REFERENCES medical system 1
data acquisition system 2
data processing system 3
active system 4
security module 5
blackbox module 6
alternative module 7
confidence assessment module 8
decision module 9
machine-learning module 10
determination module 11
predictive module 12

The invention claimed is:

1. A computerized system for the repeated determination of a set of at least one control parameter of an active medical device, wherein the computerized system comprises:
    a processor adapted to process data including patient-related data, wherein the processor is configured to implement:
        a security module adapted to evaluate, based on the data, a potential health risk of the patient using predetermined health risk evaluation rules that compare physiological parameters to predefined thresholds,
        a first blackbox module adapted to determine said set using a machine-learned process on said data,
        a second interpretable module adapted to determine said set using an alternative process based on physiological knowledge,
        a confidence assessment module, adapted to assess a level of confidence in the first blackbox module according to one or more past data sets, one or more respective actual outcomes corresponding to the past data sets, and one or more planned outcomes respectively produced by the first blackbox module using the one or more past data sets, wherein the confidence assessment module calculates the level of confidence using a weighted area-between-curves metric based on historical patient data and treatment parameters, and
        a decision module adapted to automatically determine said set based on a hierarchical function comprising an ordered sequence of (i) security module evaluation, (ii) confidence assessment, and (iii) module selection, wherein the security module takes priority over other modules, wherein
            when the security module determines a potential health risk of the patient, the decision module automatically determines said set using only the security module output,
            when the security module determines no potential health risk, the decision module automatically determines said set based on the confidence assessment module evaluation,
            wherein the function comprises automatically determining the set of control parameters by either the first blackbox module when the confidence assessment module determines confidence above a predetermined threshold or the second module when the confidence assessment module determines confidence below the predetermined threshold;
        wherein the system performs periodic determination of the set of control parameters integrated with continuous glucose monitoring;
        the active medical device is configured to dispense a substance to the patient in response to receiving the set of control parameters from the decision module, the substance including insulin.

2. A computerized system according to claim 1, wherein, when the confidence assessment module assesses a level of confidence above a threshold in the set of parameters determined by the first blackbox module, determining the set of control parameters by the first blackbox module, and when the confidence assessment module assesses a level of confidence below the threshold in the set of parameters determined by the first blackbox module, determining the set of control parameters by the second module.

3. A computerized system according to claim 1, wherein the computerized system further comprises a machine-learning module adapted to repeatedly update the first blackbox module.

4. A computerized system according to claim 3, comprising a scheduler, wherein the scheduler is operative to implement activation function scheduling according to ratio alternatives (a), (b), and (c) at least one of the following wherein:
    (a) the scheduler is adapted to cause the repeated determination of the set of control parameters more frequently, notably at least twice as frequently, even more notably at least ten times more frequently, than the update of the first blackbox module;
    (b) the scheduler is adapted to cause the repeated determination of the set of control parameters more frequently, notably at least twice as frequently, even more notably at least ten times more frequently, than setting one or more activation functions of the first blackbox module; and
    (c) the scheduler is adapted to set said one or more activation functions more frequently, notably at least twice as frequently, even more notably at least ten times more frequently, than the update of the first blackbox module.

5. A computerized system according to claim 1, wherein the second module is not machine-learned.

6. A computerized system according to claim 1, wherein the first blackbox module is adapted to determine said set using a blackbox prediction module adapted to estimate a predictive value for a physiological parameter of the patient.

7. The computerized system according to claim 1, wherein the computerized medical system further comprises a communication module adapted to repeatedly communicate the at least one parameter of the set of control parameters from the computerized system to the active medical device.

8. A computerized medical system according to claim 1, wherein the active medical device is not implantable and/or comprises a pump controllable according to the set of control parameters to dispense fluid to the patient.

9. A computerized medical system according to claim 7, wherein a computerized medical system further comprises a data acquisition system adapted to acquire patient-related data, and wherein the communication module is adapted to repeatedly communicate the patient-related data to the computerized system.

10. Composition delivered by a dispenser of a computerized medical system according to claim 1.

11. The computerized system of claim 1, wherein the predetermined health risk evaluation rules comprise detecting at least one of hypoglycemia and hyperglycemia conditions by comparing current glucose levels to predefined threshold values.

12. The computerized system of claim 1, wherein the confidence assessment module calculates the level of confidence using weighted error analysis that favors recent historical data over older historical data.

13. The computerized system of claim 1, wherein the first blackbox module comprises a recurrent neural network with Long Short-Term Memory (LSTM) architecture configured for temporal analysis of physiological data.

14. A computer program comprising instructions which, when the program is executed by a computer of a computerized medical system including an active medical device, cause the computerized medical system to:
  carry out a repeated determination of a set of at least one control parameters of the active medical device, including:
  evaluating, by a security module based on data including patient-related data, a potential health risk of the patient,
  when the security module determines a potential health risk of the patient, determining a final set of values for the set of control parameters by the security module, and
  when the security module determines no potential health risk, determining the final set of values based on a function of one or more of a first blackbox module, a second interpretable module, and a confidence assessment module, the determining including:
  receiving, from the first blackbox module using a machine-learned process on said data, a first set of values for the set of control parameters,
  assessing, by the confidence assessment module, a level of confidence in the first blackbox module according to one or more past data sets, one or more respective actual outcomes corresponding to the past data sets, and one or more planned outcomes respectively produced by the first blackbox module using the one or more past data sets, and
  determining, by a decision module, the final set of values for the set of control parameters based on a function of the security module, the first blackbox module, the second interpretable module and the confidence assessment module, the decision module being adapted to architecture the operation of the security module, the first blackbox module, the second module, and the confidence assessment module, including:
  when the level of confidence is above a pre-defined threshold, determining the final set of values using the first set of values, and
  when the level of confidence is below the pre-defined threshold, determining the final set of values by:
    determining, by the second interpretable module using an alternative process based on physiological knowledge, a second set of values for the set of control parameters, and
    determining the final set of values using the second set of values, communicating the final set of values to the active medical device as the set of control parameters; and
  dispensing, by the active medical device according to the set of control parameters, insulin to the patient.

* * * * *